United States Patent
Xie et al.

(10) Patent No.: US 10,310,081 B2
(45) Date of Patent: Jun. 4, 2019

(54) SYSTEM AND METHOD FOR ULTRASOUND DISTANCE DETECTION

(71) Applicant: SZ DJI TECHNOLOGY CO., LTD., Shenzhen, Guangdong (CN)

(72) Inventors: Jiebin Xie, Guangdong (CN); Litian Zhang, Guangdong (CN); Wei Ren, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 7 days.

(21) Appl. No.: 15/169,449

(22) Filed: May 31, 2016

(65) Prior Publication Data
US 2017/0059704 A1 Mar. 2, 2017

Related U.S. Application Data

(63) Continuation of application No. PCT/CN2015/083638, filed on Jul. 9, 2015.

(51) Int. Cl.
*G01S 15/88* (2006.01)
*G01S 15/08* (2006.01)
(Continued)

(52) U.S. Cl.
CPC ............. *G01S 15/08* (2013.01); *G01S 15/10* (2013.01); *G01S 15/93* (2013.01); *B64C 2201/00* (2013.01); *B64C 2201/02* (2013.01)

(58) Field of Classification Search
None
See application file for complete search history.

(56) References Cited

U.S. PATENT DOCUMENTS 3,877,010 A * 4/1975 Holberg ............. G01S 13/5244
342/161
4,054,862 A * 10/1977 Backman, Jr. ........ G01S 15/101
367/100

(Continued)

FOREIGN PATENT DOCUMENTS

| CN | 101625411 A | 1/2010 |
| CN | 102445694 A | 5/2012 |

(Continued)

OTHER PUBLICATIONS

Foxlin, Eric, Michael Harrington, and George Pfeifer. "Constellation: a wide-range wireless motion-tracking system for augmented reality and virtual set applications." Proceedings of the 25th annual conference on Computer graphics and interactive techniques. ACM, 1998.*

(Continued)

*Primary Examiner* — Isam A Alsomiri
*Assistant Examiner* — Jonathan D Armstrong
(74) *Attorney, Agent, or Firm* — Anova Law Group, PLLC

(57) ABSTRACT

A system for using ultrasound to detect distance on mobile platform and methods for making and using same. The system includes an ultrasound transceiver that can transmit and/or receive ultrasound waves and determine distance from an object of interest using a time-of-flight of the ultrasound wave. The system is adapted to reduce noise by using a dynamic model of the mobile platform to set constraints on the possible location of a received ultrasound echo. A linear, constant-speed dynamic model can be used to set constraints. The system can further reduce noise by packetizing a received ultrasound waveform and filtering out noise according to height and width of the packets. The system likewise can remove dead zones in the ultrasound transceiver by subtracting an aftershock waveform from the (Continued)

received waveform. The systems and methods are suitable for ultrasound distance detection on any type of mobile platform, including unmanned aerial vehicles.

19 Claims, 12 Drawing Sheets

(51) Int. Cl.
*G01S 15/93* (2006.01)
*G01S 15/10* (2006.01)

(56) References Cited

U.S. PATENT DOCUMENTS

| | | | | |
|---|---|---|---|---|
| 4,214,242 A * | 7/1980 | Colin | ............... | G01S 13/225 342/137 |
| 4,809,554 A * | 3/1989 | Shade | ............... | A01M 1/026 367/136 |
| 4,839,657 A * | 6/1989 | Chikhani | ............... | G01S 7/046 342/190 |
| 4,893,286 A * | 1/1990 | Cobb | ............... | E21B 47/082 181/105 |
| 5,181,039 A * | 1/1993 | Oswald | ............... | F41J 5/12 342/119 |
| 5,319,974 A * | 6/1994 | Lenz | ............... | G01F 1/002 181/124 |
| 5,831,570 A * | 11/1998 | Ammar | ............... | F41G 7/2226 342/26 B |
| 7,111,509 B2 * | 9/2006 | Laun | ............... | G01F 23/284 73/290 R |
| 7,186,965 B2 * | 3/2007 | Schrey | ............... | G01S 7/481 250/214 VT |
| 7,436,496 B2 * | 10/2008 | Kawahito | ............... | G01S 7/4863 257/E31.054 |
| 7,629,922 B2 * | 12/2009 | Winstead | ............... | G01S 13/18 342/175 |
| 8,284,383 B2 * | 10/2012 | Beppu | ............... | G01S 17/936 342/70 |
| 8,567,251 B2 * | 10/2013 | Welle | ............... | G01S 7/2922 73/602 |
| 9,170,146 B2 * | 10/2015 | Gorenflo | ............... | G01F 23/284 |
| 9,383,436 B2 * | 7/2016 | Dewberry | ............... | G01S 11/02 |
| 9,823,104 B2 * | 11/2017 | Rowe | ............... | G01F 1/667 |
| 2004/0143176 A1 * | 7/2004 | Foxlin | ............... | G01C 21/165 600/395 |

FOREIGN PATENT DOCUMENTS

| | | |
|---|---|---|
| CN | 103364785 A | 10/2013 |
| CN | 103941259 A | 7/2014 |
| JP | H0261582 A | 3/1990 |
| JP | 2000284046 A | 10/2010 |
| JP | 2013212832 A | 10/2013 |
| JP | 2014006234 A | 1/2014 |
| JP | 5442215 B2 | 3/2014 |
| WO | 2013088951 A1 | 6/2013 |
| WO | 2015033436 A1 | 3/2015 |

OTHER PUBLICATIONS

Wan, Eric A., and Anindya S. Paul. "A tag-free solution to unobtrusive indoor tracking using wall-mounted ultrasonic transducers." Indoor Positioning and Indoor Navigation (IPIN), 2010 International Conference on. IEEE, 2010.*

Abbeel, Pieter, Adam Coates, and Andrew Y. Ng. "Autonomous helicopter aerobatics through apprenticeship learning." The International Journal of Robotics Research (2010).*

Khatib, Oussama, and Bruno Siciliano, eds. Springer Handbook of Robotics. Springer. Ch. 21. Sonar Sensing. 2008.*

SIGGRAPH 2001. Course 8 An Introduction to the Kalman Filter. Gary Bishop. University of North Carolina at Chapel Hill. (Year: 2001).*

WO, International Search Report and Written Option, PCT/CN2015/083638, dated Apr. 1, 2016.

The World Intellectual Property Office (WIPO) International Preliminary Report of Patentability for PCT/CN2015/083638 Oct. 23, 2017 47 Pages.

* cited by examiner

1100

SYSTEM AND METHOD FOR ULTRASOUND DISTANCE DETECTION

CROSS-REFERENCE TO RELATED APPLICATIONS

This application is a continuation of, and claims priority to, copending PCT Patent Application Number PCT/CN2015/083638, which was filed on Jul. 9, 2015. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to ultrasound distance detection and more particularly, but not exclusively, to systems and methods for ultrasound distance detection on a mobile platform.

BACKGROUND

Ultrasound is a useful technique for ranging, or the measurement of distance to an object of interest, and is especially important for environmental sensing on mobile platforms. Ultrasound distance detection involves an ultrasound wave that is transmitted from an ultrasound source to the object of interest. The ultrasound wave reflects from the object of interest and is transmitted back to the ultrasound source. Since sound has a relatively constant velocity, a travel time for the ultrasound pulse to reflect from the object of interest and return to the ultrasound source is directly proportional to the distance between the source and the object. Thus, by measuring the travel time of the ultrasound pulse, the distance can be determined.

Since distance detection requires accurate identification of a reflected ultrasound wave (or "echo"), the presence of background noise can lead to misidentification of the echo and faulty distance detection. The problem of background noise is especially acute for mobile platforms that rely on mechanical motion—for example, propellers on unmanned aerial vehicles (UAVs)—for movement, since such mechanical motions can cause strong high-frequency sounds that are detected with the echo. Resulting waveforms received by the ultrasound transceiver can therefore be difficult to de-convolute. Existing techniques for noise reduction often fail under such circumstances.

In view of the foregoing, there is a need for systems and methods that more robustly separate signal from noise for ultrasound distance detection.

Figure 1:
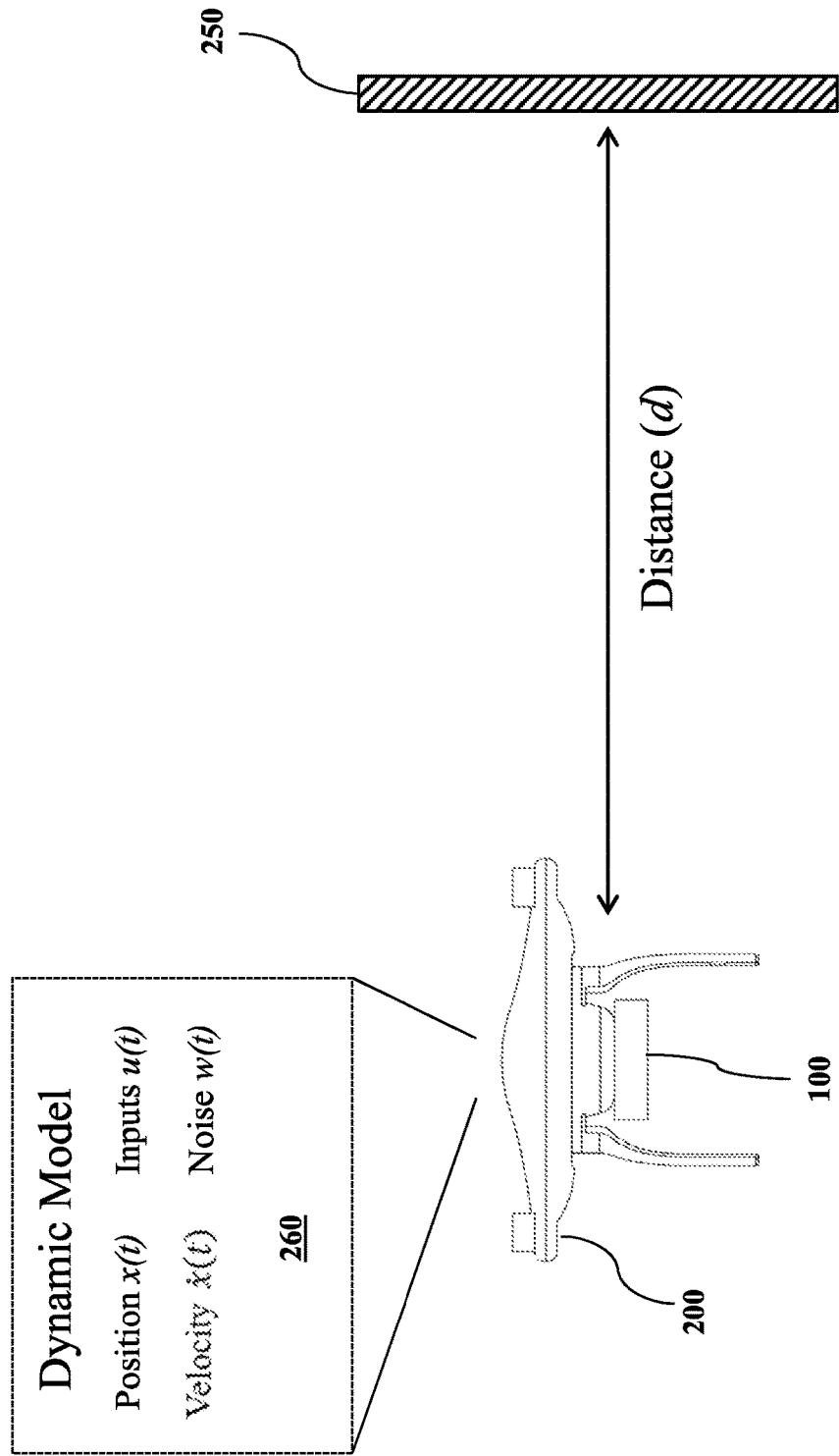
FIG. 1 is an exemplary diagram illustrating an embodiment of a mobile platform with an ultrasound distance-detection system for determining a distance between the mobile platform and an object of interest.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The present disclosure sets forth systems and methods for reducing noise in distance detection using ultrasound, overcoming the disadvantages of prior systems and methods.

Turning now to FIG. 1, an embodiment of a mobile platform 200 is shown with an ultrasound distance-detection system 100 mounted thereon. The mobile platform 200 is shown in relation to an object of interest 250, which can be an obstacle to be avoided by the mobile platform 200. The mobile platform 200 is situated at position x(t) a distance d from the obstacle 250 and is moving at a velocity v relative to the obstacle 250. The ultrasound distance-detection system 100 is configured to determine the distance d based the transmission of ultrasound and subsequent echoes of that ultrasound from the obstacle 250. The reflected ultrasound echoes can be identified, for example, by motion estimation of the mobile platform 200. The motion estimation can comprise using a dynamic model 260 that can include a set of functions and/or variables that track the state of the mobile platform 200 over time. As illustrated in FIG. 1, the dynamic model 260 can include, for example, a position x(t), a velocity ẋ(t), one or more inputs u(t), noise w(t), one or more other parameters, and one or more functions relating to motion estimation for the mobile platform 200.

Exemplary mobile platforms 200 include, but are not limited to, bicycles, automobiles, trucks, ships, boats, trains, helicopters, aircraft, various hybrids thereof, and the like. In some embodiments, the mobile platform 200 is an unmanned aerial vehicle (UAV). Colloquially referred to as "drones," UAVs are aircraft without a human pilot onboard the vehicle whose flight is controlled autonomously or by a remote pilot (or sometimes both). UAVs are now finding increased usage in civilian applications involving various aerial operations, such as data-gathering or delivery. The present control systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs. In some embodiments, the dynamic model 260 can be customized to the type and/or model of the mobile platform 200. For example, quadcopter UAVs have significant lateral and vertical movement, and the dynamic model 260 of the quadcopter UAVs can reflect such movement properties. In the embodiments, the UAV can include the ultrasound distance-detection system 100 or components thereof.

Figure 2:
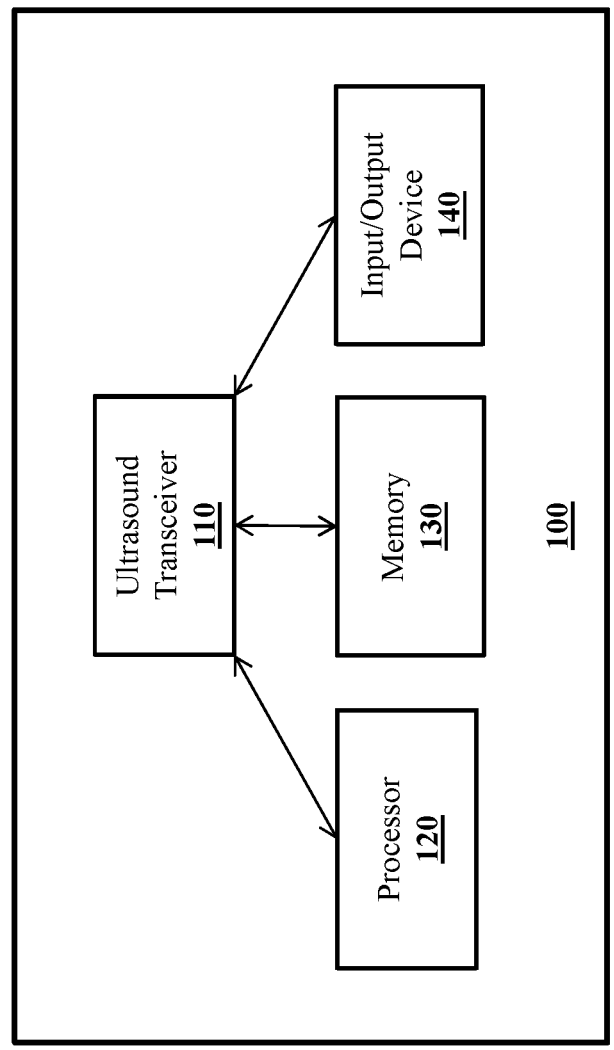
FIG. 2 is an exemplary top-level block diagram illustrating an embodiment of the ultrasound distance-detection system of FIG. 1.

Turning now to FIG. 2, an exemplary ultrasound distance-detection system 100 is shown as including at least one ultrasound transceiver (or transducer) 110. The ultrasound transceiver 110 can convert ultrasound waves into electrical signals and vice versa. Exemplary ultrasound transducers can include piezoelectric transducers and capacitive transducers. In some embodiments, the ultrasound transceiver 110 can be an arrayed ultrasound transceiver—for example, in which individual transceiver elements are arrayed in a one-dimensional or two-dimensional configuration.

As shown in FIG. 2, the ultrasound transceiver 110 can communicate with a processor 120. Without limitation, the processor 120 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processor 120 can be configured to perform any of the methods described herein, including but not limited to operations relating to ultrasound pulse identification and filtering, dynamic model analysis, and/or distance analysis. In some embodiments, the processor 120 can include at least some specialized hardware for processing specific operations relating to ultrasound pulse identification and filtering, dynamic model analysis, and/or distance analysis.

As shown in FIG. 2, the ultrasound distance-detection system 100 can include one or more additional hardware components, as desired. Exemplary additional hardware components include, but are not limited to, a memory 130. The memory 130 can include, for example, a random access memory (RAM), a static RAM, a dynamic RAM, a read-only memory (ROM), a programmable ROM, an erasable programmable ROM, an electrically erasable programmable ROM, a flash memory, and/or a secure digital (SD) card. The memory 130 can further include one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). The memory 130 can include a non-transitory storage medium containing instructions for carrying out one or more of the processes disclosed herein. Some embodiments comprise a computer program for carrying out one of more of the processes disclosed herein.

The ultrasound distance-detection system 100 can include one or more input/output devices 140. Exemplary input/output devices 140 can include buttons, a keyboard, a keypad, a trackball, displays, and/or a monitor.

Figure 3:
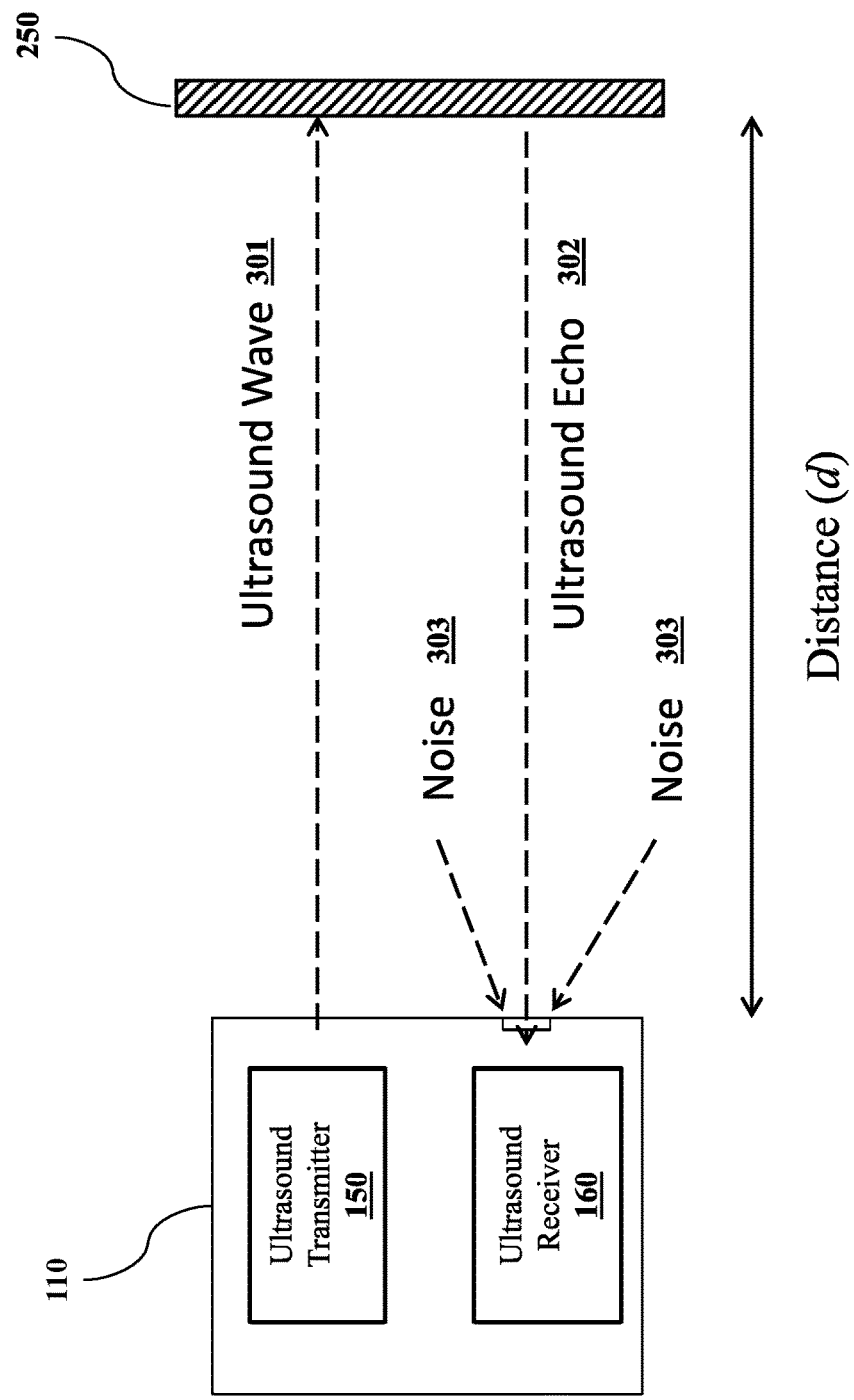
FIG. 3 is an exemplary diagram illustrating an alternative embodiment of the ultrasound distance-detection system of FIG. 1, wherein the ultrasound distance-detection system includes an ultrasound transceiver.

Turning now to FIG. 3, an exemplary embodiment of the ultrasound transceiver 110 is shown as including an ultrasound transmitter 150 and an ultrasound receiver 160. The ultrasound transmitter 150 can be any device that converts energy (for example, electrical energy) into ultrasound. For example, the ultrasound transmitter 150 can be a piezoelectric transducer. Piezoelectric transducers include piezoelectric crystals having the property of changing size when a voltage is applied. An alternating current applied across the piezoelectric material causes the material to vibrate at the frequency of the applied current, generating high frequency sound waves. For example, the material will generate high frequency sound waves when a high-frequency current is applied and generate low frequency sound waves when a low-frequency current is applied. Other types of ultrasound transmitters 150 can be based on capacitive ultrasound transducers that, for example, use a vibrating membrane driven by alternating current to generate ultrasound. Additionally and/or alternatively, other non-piezoelectric transducers (for example, magnetostrictive transducers) can be suitable for use in ultrasound transmitters 150.

The ultrasound receiver 160 functions similarly to the ultrasound transmitter 150 but in reverse, converting received ultrasound echoes into an electrical signals or other form of energy. Once converted into an electrical signal, information regarding the received ultrasound signal embedded in the electrical signal can be communicated to the processor 120 (shown in FIG. 2) to analyze, for example, the distance d to the obstacle 250 (collectively shown in FIG. 1). Although shown as separate devices for illustrative purposes only, the ultrasound transmitter 150 and the ultrasound receiver 160 can be at least partially integrated into a common physical apparatus. In some embodiments, a single ultrasound transducer can act as both the ultrasound transmitter 150 and the ultrasound receiver 160 simultaneously. In other embodiments, the ultrasound transmitter 150 and the ultrasound receiver 160 are separate and distinct devices.

The frequency of emitted and received ultrasound depends on the desired range of detection because the frequency is inversely proportional to the distance that can be sensed using the ultrasound. In some embodiments, the ultrasound transmitter 150 can operate at a frequency between 20 kHz and 200 kHz—for example, between 25 kHz and 150 kHz, 50 kHz and 100 kHz, 60 kHz and 80 kHz, or about 75 kHz. In some embodiments where ultrasound is used for short-range distance-detection applications, the frequency can exceed 200 kHz, and may be as high as 300 kHz, 400 kHz, 500 kHz, 1 MHz, or even higher. The frequency or frequency range of the ultrasound transmitter 150 can advantageously be tuned to the desired detection range. Furthermore, the frequency of the ultrasound transmitter 150 can be adjusted depending on an acoustic reflectivity of the object of interest 250, an angle of the surface of the object of interest 250 relative to the incident ultrasound pulse, and/or other factors that affect the transmission and reflection of ultrasound.

As shown in FIG. 3, the ultrasound transmitter 150 emits an ultrasound wave (or "pulse") 301 at a desired frequency toward the object of interest 250. The ultrasound wave 301 reflects off of the object of interest 250 and is detected by the ultrasound receiver 160. The time elapsed between the transmission event and the detection event can be used to find the distance d between the mobile platform 200 and the object of interest 250, assuming that the speed of ultrasound is constant and known.

However, the difficulty with this approach to distance detection is that the relevant ultrasound echo 302 can be hard to distinguish from noise 303 as illustrated in FIG. 3. The noise can take many types and can originate from many different sources. For example, the noise can take the form of white noise—that is, a random signal with a constant power spectral density—for example, Gaussian noise, Poisson noise, Cauchy noise, and others. In other cases, noise can take the form of non-white noise that is generated from irregular events. The ultrasound echo 302 and the noise 303 blend together into a single waveform 500 (shown in FIG. 5) and detected by the ultrasound receiver 160. The echo 302 is then de-convoluted from the noise 303. The position of the echo 302 can be used to infer the travel time of the ultrasound wave to and from the object of interest 250.

Figure 4:
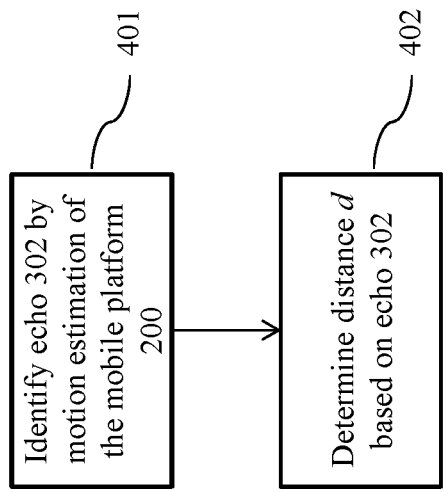
FIG. 4 is an exemplary top level flow chart illustrating an embodiment of a method for determining the distance of FIG. 1 using ultrasound.

Turning now to FIG. 4, an exemplary method 400 for determining the distance d between the mobile platform 200 and the obstacle 250 (collectively shown in FIG. 1) is shown as using motion estimation of the mobile platform 200 to identify the ultrasound echo 302 received from the object of interest 250. An advantage of the method 400 is that the position of the ultrasound echo 302 in an ultrasound waveform received by the ultrasound receiver 160 (shown in FIG. 3) can be narrowed down to a specific range based on motion estimation of the mobile platform 200. Signals outside of this range are presumptively noise 303 (shown in FIG. 3) to be discarded. Thus, at 401, the ultrasound echo 302 received from the object of interest 250 is identified by motion estimation of the mobile platform 200. At 402, the distance d can be measured based on the ultrasound echo 302.

Figure 5:
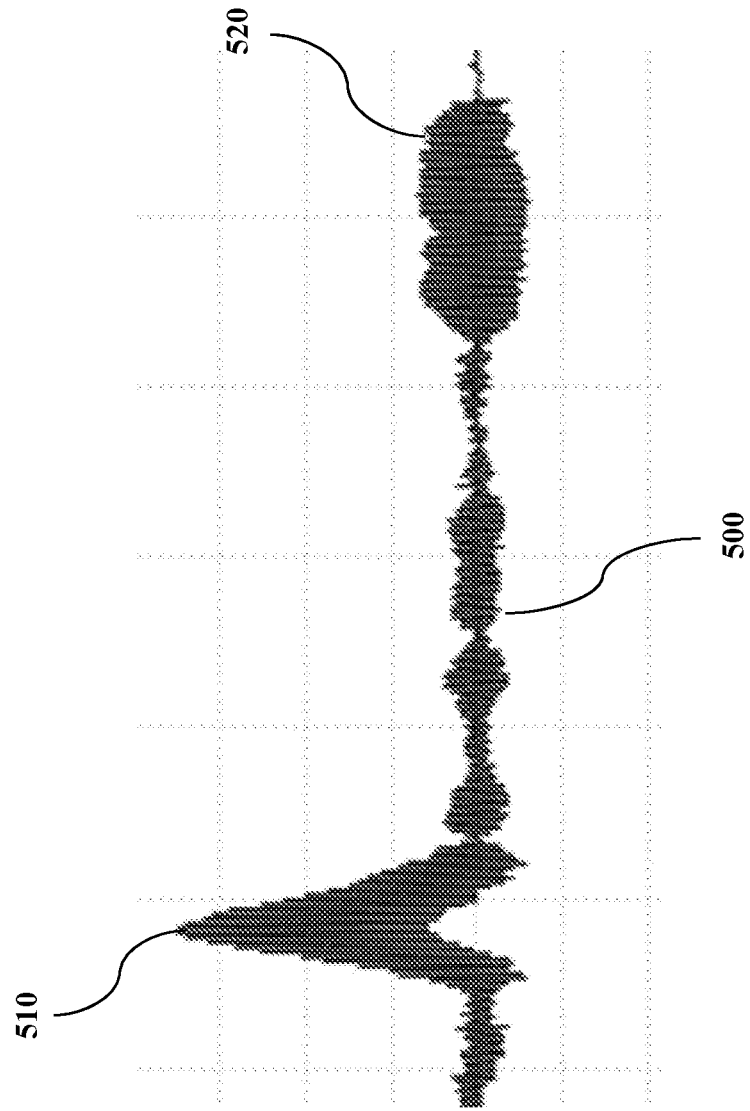
FIG. 5 is an exemplary diagram illustrating a waveform detected by the ultrasound distance-detection system of FIG. 1 that includes an ultrasound echo as well as noise.

Turning now to FIG. 5, an exemplary ultrasound waveform 500 is depicted. The waveform 500 represents the sound wave amplitude (vertical axis) over time (horizontal axis). For example, the ultrasound waveform 500 can represent a combination of sounds received by the ultrasound receiver 160 (shown in FIG. 3). The ultrasound waveform 500 can include both the desired ultrasound echo 302 as reflected from the object of interest 250 (shown in FIG. 1) and noise 303 (shown in FIG. 3) from background sources.

As depicted in FIG. 5, the ultrasound waveform 500 includes first and second waveform peaks 510, 520. The first waveform peak 510 corresponds to the ultrasound echo 302 (shown in FIG. 3) and is illustrated as being narrow with a relatively high amplitude. In contrast, the second waveform peak 520 corresponding to the noise 303 (shown in FIG. 3) is shown as being broader than the first waveform peak 510 and has a low amplitude relative to the first waveform peak 510. The first and second waveform peaks 510, 520 are general distinguishing characteristics of ultrasound signal and noise, respectively. These general distinguishing characteristics are attributable to the fact that ultrasound echoes have high frequencies (usually greater than 10 kHz); whereas, noise tends to have lower frequencies (commonly less than 1 kHz). These distinguishing characteristics can be the basis for filtering noise from signal in the waveform 500, as described below in method 600.

Figure 6:
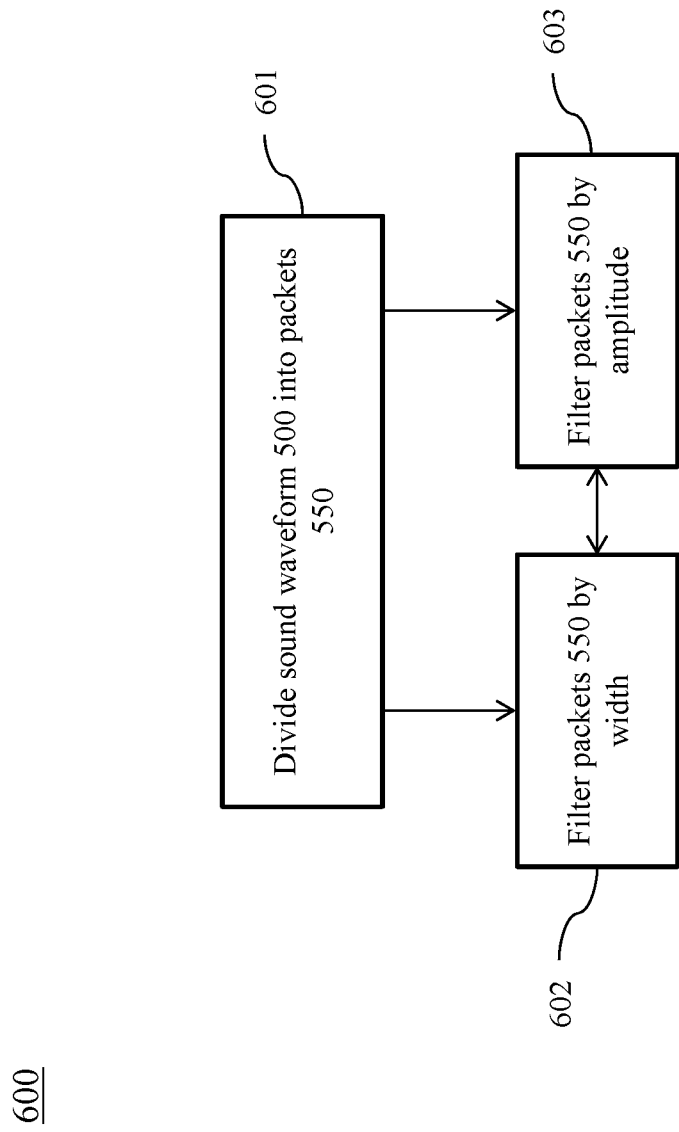
FIG. 6 is an exemplary flow chart illustrating an embodiment of the method of FIG. 4, wherein the distance is determined by packetizing and filtering a received waveform.

Turning now to FIG. 6, an exemplary method 600 is shown for filtering out noise from signal in a waveform 500—for example, a waveform 500 received by an ultrasound receiver 150 (shown in FIG. 3). The method 600 takes advantage of the tendency of ultrasound signals to be tall (that is, large amplitude) but narrow, whereas, noise is shorter and wider in comparison. At 601, a preliminary step of dividing the waveform 500 into packets 550 can be performed. Various techniques for performing the division of the waveform 500 into packets 550 can be used. For example, the waveform 500 can simply be divided into time intervals. The time intervals can have any suitable predetermined duration, and the predetermined durations can be uniform and/or differ among the time intervals. The predetermined durations of the time intervals can be based upon, for example, the frequency of the waveform 500. Alternatively and/or additionally, in some embodiments, a peak selection technique (for example, a Benjamini-Hochberg-based technique) can be used that selects packets 550 on the basis of peaks in the waveform 500.

At 602, the packets 550 of the waveform 500 can be filtered by width, which takes units of time. A threshold width can be established, and packets 550 having a width exceeding the threshold can be disregarded as noise. The threshold value can be a predetermined value and/or can be dynamically determined based, for example, on prior known echoes 302. In some embodiments, the threshold value can be determined as a multiple of an average (for example, a running average) width of previously known echoes 302. The multiple used for the threshold can be, for example, 1, 1.2, 1.5, 1.8, 2.0, 3.0, 4.0, or greater. As an illustrative example, if the average width of an echo packet is 0.1 milliseconds and the threshold multiple is 2.0, then all packets having a width of 0.2 milliseconds or more will be discarded as noise as a result of applying a width filter.

At 603, the packets 550 can be filtered using an amplitude threshold (or, equivalently, a height threshold). Any packets 550 having an amplitude that is less than the amplitude threshold can be disregarded as noise. The threshold value can be a predetermined value and/or can be dynamically determined based on prior known echoes 302. In some embodiments, the threshold value can be determined as a fraction of an average (for example, a running average) amplitude of previously known echoes 302. The fraction used for the amplitude threshold can be, for example, 0.3, 0.5, 0.7, 0.8, or greater.

Here, the order in which the width filter at 602 and the amplitude filter at 603 are applied is flexible and can be configured as needed. In some embodiments, the width filter is applied prior to the amplitude filter. In other embodiments, the amplitude filter is applied prior to the width filter. In some embodiments, the filters are not applied sequentially, but considered together. For example, a tall packet 550A can have a less restrictive criterion for width selection; whereas, a short packet 550B can have a more restrictive criterion for width selection. Similarly, a narrow packet 550C can have a less restrictive criterion for height selection, whereas a wide packet 550D can have more restrictive criterion for height selection. In some embodiments, an area (which accounts for height and width) of the packet 550 can be a factor in the filter process. For example, packets 550 having an area that is less than a predetermined threshold value can be discarded as noise.

Figure 7:
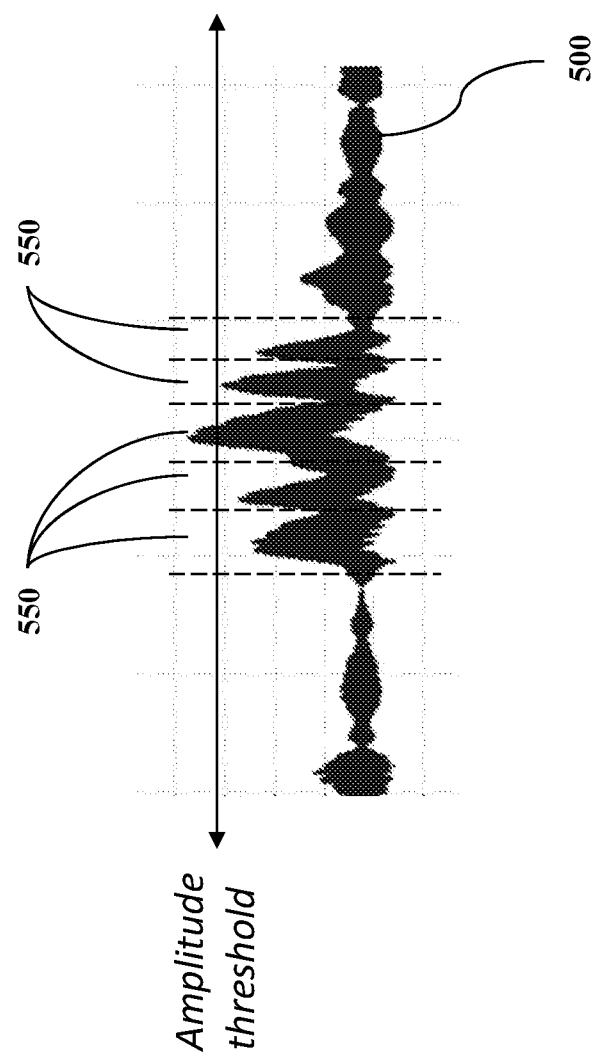
FIG. 7 is an exemplary diagram illustrating the packetized and filtered waveform of FIG. 6.

Turning now to FIG. 7, the method 600 of dividing a waveform 500 into packets 550 and filtering the packets is depicted on an exemplary waveform. Here, the packetization of a region in the center of the waveform 500 is shown for several peaks in the middle of the waveform 500. A filter in the form of an amplitude threshold is applied, leaving only the center packet 550 as an echo 302.

Filtering by width and/or amplitude can be applied prior to the filtering of the waveform 500 using motion estimation, as a form of pre-processing of the waveform 500. Alternatively and/or additionally, the filtering by width and/or amplitude can be performed after filtering of the waveform 500 using motion estimation. Stated somewhat differently, the filtering of the method 600 can be applied as pre-processing, post-processing, or both.

Figure 8:
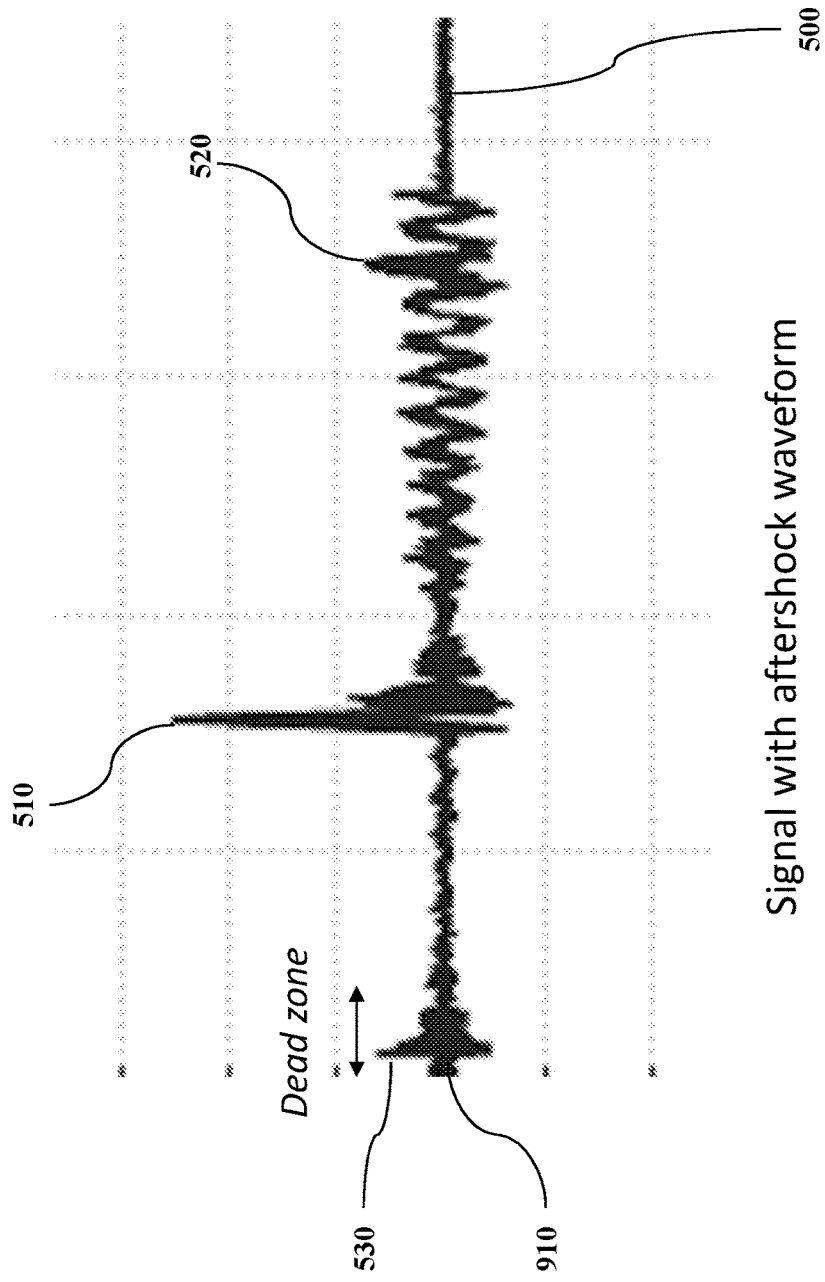
FIG. 8 is an exemplary diagram illustrating a waveform that includes a dead zone.

Turning now to FIG. 8, an ultrasound waveform 500 received by an ultrasound transmitter 150 (shown in FIG. 3) is shown. The ultrasound waveform 500 includes a first waveform peak 510 corresponding to the ultrasound echo 302 (shown in FIG. 3) and a second waveform peak 520 corresponding to noise 303 (shown in FIG. 3). The ultrasound waveform 500 further includes a third waveform peak 530 corresponding to an aftershock waveform 910. The aftershock waveform 910 results from residual vibrations (or "aftershocks") in the ultrasound transmitter 150 that are received by the ultrasound receiver 160 (shown in FIG. 3). The aftershock occurs for a certain time duration after the ultrasound wave 301 (shown in FIG. 3) is emitted, creating a "dead zone." During the dead zone, echoes 302 received by the ultrasound receiver 160 overlap with the aftershocks, preventing detection of echoes 302 immediately after emitting the ultrasound wave 301. The dead zone therefore prevents the detection of obstacles 250 that are too close to the mobile platform 200.

Figure 9:
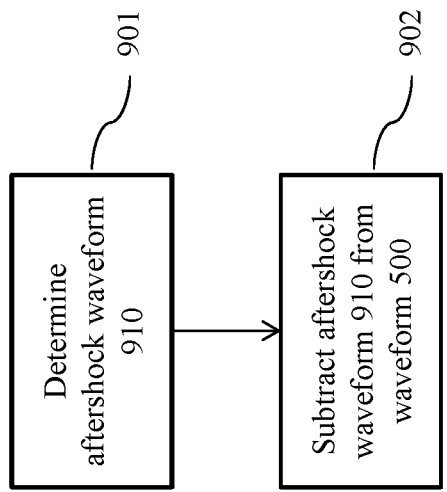
FIG. 9 is an exemplary flow chart illustrating an embodiment of the method of FIG. 4, wherein the distance is determined using ultrasound by subtracting an aftershock waveform resulting from vibration of an ultrasound transmitter.

Turning now to FIG. 9, an exemplary method 900 is shown for eliminating an aftershocks waveform 910 from a waveform 500. The dead zone problem can be solved based on the fact that aftershocks are a function of the physical characteristics of the ultrasound transmitter 150. Therefore, each ultrasound transmitter 150 has a characteristic aftershock waveform 910. The characteristic aftershock waveform 910 occurs at a particular time after the initial ultrasound wave 301 is emitted. In some embodiments, the aftershock waveform 910 is insensitive to the operating conditions—for example, temperature and pressure—of the ultrasound transmitter 150. Since the aftershock waveform 910 for each ultrasound transmitter 150 can be determined in advance of any imaging operations, the aftershock waveform 910 can be removed from any waveform 500 received by the ultrasound receiver 160 to mitigate the "dead zone" problem.

Accordingly, at 901, an aftershock waveform 910 can be determined. The ultrasound transmitter 150 can be operated under reduced echo and/or reduced noise conditions (for example, in a large sound-proof room). Under such conditions, the waveform 500 received by the ultrasound receiver 160 can be a good estimate for the aftershock waveform 910. The aftershock waveform 910, as estimated, can be recorded and stored in a memory 130. In some embodiments, the timing of the aftershock waveform 910 relative to a corresponding emission of the ultrasound wave 310 can be recorded and stored in the memory 130.

At 902, at the time of operation of the ultrasound distance-detection system 100, the aftershock waveform 910 can be retrieved from the memory 130 and subtracted from the waveform 500 received by the ultrasound receiver 160. Subtracting the aftershock waveform 910 is preferably based on the timing of the aftershock waveform 910. For example, if the aftershock waveform 910 is recorded at 10 milliseconds after generation of the initial ultrasound wave, then the aftershock waveform 910 can be subtracted from subsequently received waveforms 500 at 10 milliseconds, as well.

Figure 10:
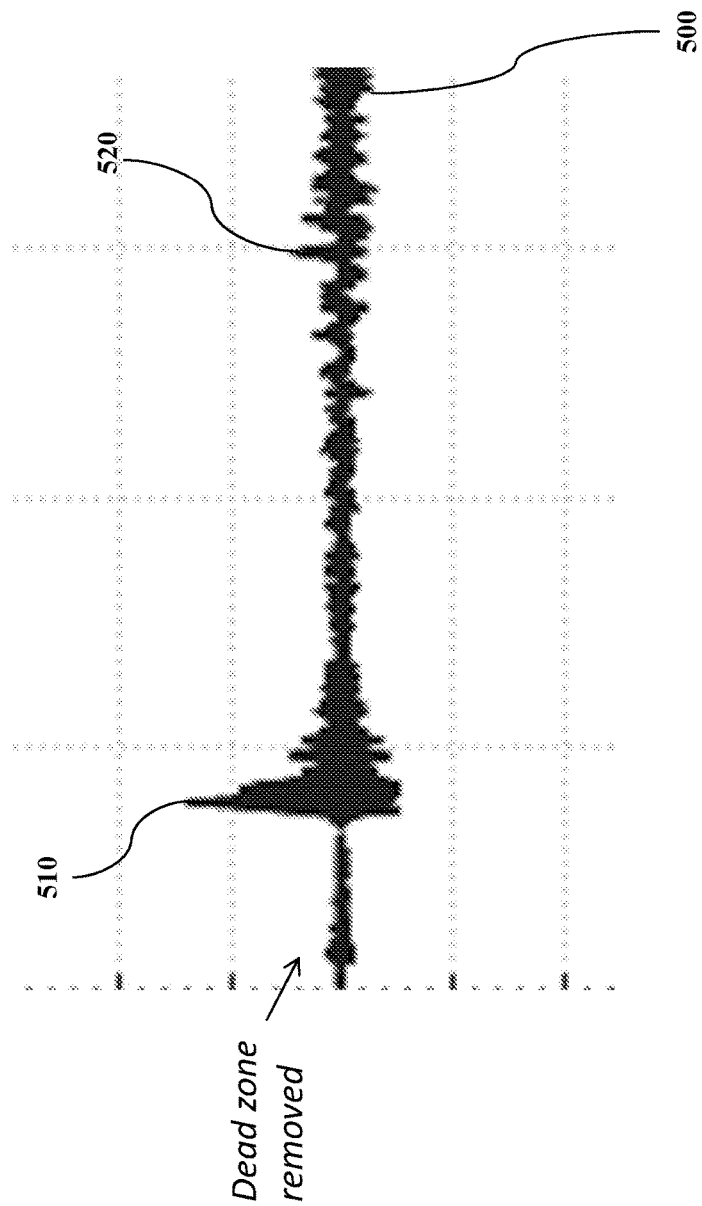
FIG. 10 is an exemplary diagram illustrating the waveform of FIG. 8, wherein the dead zone has been removed by subtracting the aftershock waveform.

FIG. 10 depicts the waveform 500 of FIG. 8 after aftershock removal. The aftershock waveform 910 (shown in FIG. 8) has been removed, while waveform peaks 510 and 520 are unaffected.

The method 900 for aftershock waveform removal can be applied prior to the filtering of the waveform 500 using a dynamic model 260, as form of pre-processing of the waveform 500. Alternatively and/or additionally, the aftershock waveform removal steps can be performed after filtering of the waveform 500 using a dynamic model 260. Stated somewhat differently, the dead zone removal steps of method 900 can be applied as pre-processing, post-processing, or both.

Figure 11:
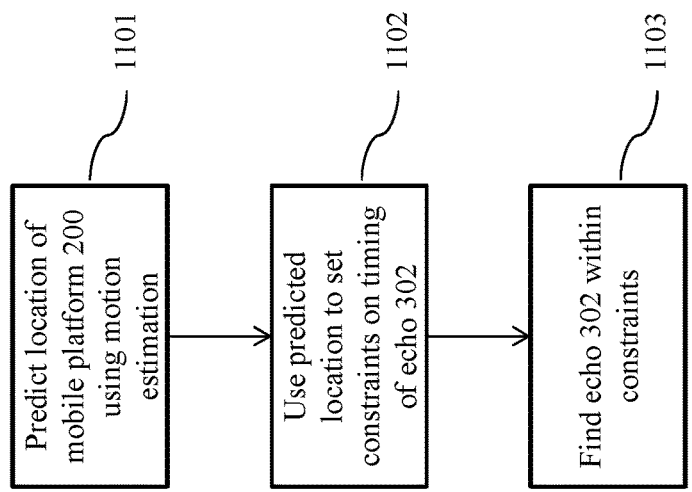
FIG. 11 is an exemplary flow chart illustrating an embodiment of the method of FIG. 4, wherein the distance is determined using ultrasound by using a dynamic model to locate an ultrasound echo on a waveform.

Turning now to FIG. 11, an exemplary method 1100 is shown for using motion estimation to constrain the range of likely echoes 302, thereby facilitating noise removal from the received waveform 500 (shown in FIG. 5). At 1101, motion estimation is used to predict a location of the mobile platform 200 at a time when an ultrasound echo 302 is expected to be received by the ultrasound receiver 160 (shown in FIG. 3). Stated somewhat differently, identification of the echo 302 is facilitated by knowing how the mobile platform 200 has moved between the time the ultrasound wave 301 is emitted and the time the ultrasound echo 302 is received.

In some embodiments, motion estimation can be performed using a dynamic model 260 (shown in FIG. 1). A dynamic model 260 is a model of how a mobile platform 200 moves over time. A dynamic model 260 can, for example, enable prediction of the position of the mobile platform 200 at a future time based on known parameters, such as position and speed. The dynamic model 260 can be discrete or continuous. In one exemplary embodiment, the dynamic model 260 can be represented as:

$$\dot{x}(t)=f(x(t),u(t))+w(t) \qquad \text{Equation (1)}$$

where x(t) represents the state of the mobile platform 200 at time t, $\dot{x}(t)$ represents the change in the state x(t) at time t (in other words, the derivative of x(t) at time t), u(t) represents the control inputs into the mobile platform 200 at time t, and w(t) represents the noise at time t. Here, the state x(t) can be a collection of variables that describe the present location, velocity, or other conditions of the mobile platform 200 at time t, and can be represented as a vector of arbitrary length. In some embodiments, the state x(t) can include variables that represent the position of the mobile platform 200 (for example, x, y, and z coordinates in a Cartesian coordinate space), as well as variables that represent the instantaneous change in the position (for example, velocities components $\dot{x}$, $\dot{y}$, $\dot{z}$). Similarly, u(t) and w(t) can be collections of variables that represent the control inputs and noise, respectively, and can be represented as vectors of arbitrary length. In some embodiments, the control inputs u(t) can be represented by a 3, 4, or 5-dimensional vector. In some embodiments, the noise w(t) can be represented by a 3, 4, or 5-dimensional vector.

Under certain circumstances in which the control inputs u(t) and the noise w(t) are unknown or difficult to ascertain, the dynamic model 260 shown in Equation (1) can be reduced to a linear dynamic model 260—that is, a dynamic model 260 in which the change in state is a linear function of the current state and inputs. In other embodiments, the dynamic model 260 can be a non-linear dynamic model 260. In certain embodiments, a simplifying assumption can be made that u(t)=0 (that is, no control inputs are given) and that w(t) is white noise having an average value of 0 and a variance of var(w). That is, the dynamic model 260 can be a fixed-speed dynamic model 260. In other embodiments, the dynamic model 260 can be a variable-speed dynamic model 260. A further simplifying assumption can be made in certain embodiments that the mobile platform 200 is limited to motion on an x-y plane, and that motion in the z-axis is negligible. That is, the dynamic model 260 can be a planar dynamic model 260. In other embodiments, the dynamic model 260 can be a non-planar dynamic model 260.

For a planar dynamic model 260, the state of the mobile platform 200 can be represented as a five-dimensional vector, as follows:

$$\vec{x}=[x,\dot{x},y,\dot{y},z] \quad \text{Equation (2)}$$

Under these assumptions, the relationship between the state of the mobile platform 200 between times k and k+1 can be presented as follows:

$$\vec{x}_{k+1}=F\vec{x}_k+G\vec{w}_k \quad \text{Equation (3)}$$

where F is a 5×5 matrix represented as $F=\text{diag}[F_2, F_2, 1]$, where $F_2=[_0{}^1{}_1{}^T]$, and $G=\text{diag}[G_2,G2,T]$, where $G_2=[T^2/2, T]'$, and T is the time elapsed between times k and k+1. As a non-limiting example, time k can represent a time at which an ultrasound wave 301 (shown in FIG. 3) is emitted from an ultrasound transmitter 150 (shown in FIG. 3), and time k+1 can represent a time at which a corresponding ultrasound echo 302 (shown in FIG. 3) is expected to be received by an ultrasound receiver 160 (shown in FIG. 3). The dynamic models described herein can be applied at other times k and k+1 as desired.

Using one or more of the dynamic models 260 illustrated above, the state of the mobile platform 200 at the time k+1 can be found. Where the linear model shown in Equation (3) is applied, $w_k$ has an average value of zero and a variance of var($w_k$), and it follows that $\vec{x}_{k+1}$ has an average value of $F\vec{x}_k$ and a variance of var($Gw_k$).

In other embodiments, other dynamic models 260 can be used to determine a state of the mobile platform 200. For example, the dynamic model 260 can be a variable-speed dynamic model 260 that accounts for a known acceleration of the mobile platform 200. The acceleration of the mobile platform 200 can be, for example, provided by an inertial measurement unit (IMU) aboard the mobile platform 200. In some embodiments, the dynamic model 260 can account for noise distributions that are not white noise distributions.

At 1102, once an average value and variance of the state $\vec{x}_{k+1}$ is determined using the dynamic model 260, a set of constraints on the timing of the echo 302 can be determined using the predicted location of the mobile platform 200. This determination can be made, for example, based on the known speed of ultrasound and coordinates of the spatial region in which the mobile platform 200 can occupy at time k+1. Finally, at 1103, an echo 302 is found within the constraints. If more than one peak remains within the constraints, other filters (for example, as described above in the methods 600 and 800) can be used to isolate the echo 302.

Figure 12:
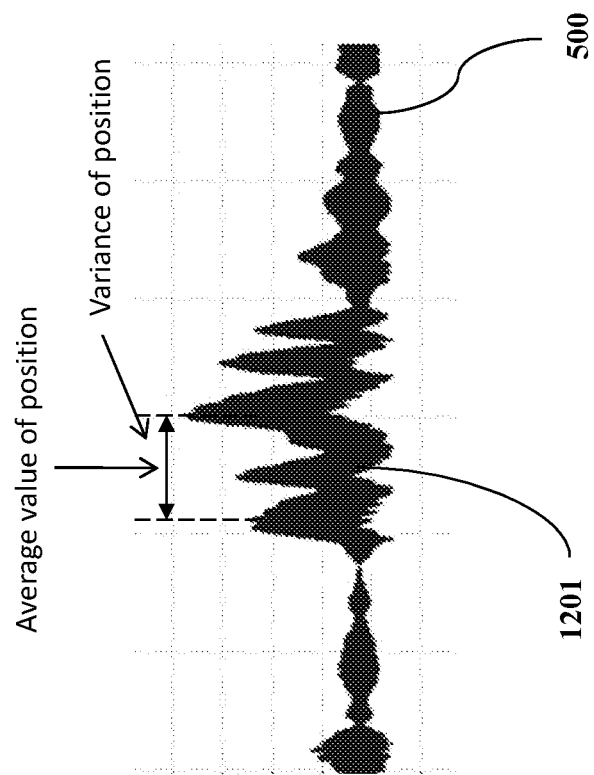
FIG. 12 is an exemplary diagram illustrating a waveform, wherein constraints on a possible position of the ultrasound echo have been set.

The setting of constraints on the timing of the echo 302 (shown in FIG. 3) is illustrated in FIG. 12. Here, upper and lower constraints for the timing of the echo 302 are illustrated as vertical dashed lines, where the width of the constraints and the position of the constraints are determined according to the average value and variance of the state $\vec{x}_{k+1}$ according to the dynamic model. In this example, it can be determined that only a single peak 1201 qualifies as the echo 302 within the constraints set by the dynamic model 260.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of ultrasound distance detection for a mobile platform, the method comprising:
    emitting an ultrasound wave from the mobile platform;
    estimating, based on a dynamic model and using a state of the mobile platform at a time when the ultrasound wave is emitted, a state of the mobile platform at a time when an ultrasound echo of the ultrasound wave, which is reflected by an object, is expected to be received by the mobile platform, the state of the mobile platform including a position of the mobile platform and a change of the position of the mobile platform over time, and the dynamic model including a relationship between the state of the mobile platform, a change of the state of the mobile platform over time, and an assumed noise;
    predicting a location of the mobile platform at the time when the ultrasound echo of the ultrasound wave is expected to be received by the mobile platform based on an average value and a variance of the state of the mobile platform at the time when the ultrasound echo of the ultrasound wave is expected to be received by the mobile platform;
    determining a set of timing constraints on a timing of the ultrasound echo being received by the mobile platform using the predicted location of the mobile platform, including determining a width and a position of the timing constraints according to the average value and the variance, respectively, of the state of the mobile platform at the time when the ultrasound echo of the ultrasound wave is expected to be received by the mobile platform;
    identifying the ultrasound echo from a received sonic waveform within the timing constraints, including distinguishing the ultrasound echo from noise on the received sonic waveform by:
        dividing the sonic waveform into packets; and
        filtering the packets using a threshold packet bandwidth or amplitude to identify one of the packets that corresponds to the ultrasound echo, the threshold packet bandwidth being multiple of an average width of previously known echoes, and the threshold packet amplitude being a fraction of an average amplitude of the previously known echoes; and
    determining a distance between the mobile platform and the object based upon the ultrasound echo.

2. The method of claim 1, further comprising, prior to said identifying:
    determining an aftershock waveform resulting from residual vibrations in an ultrasound transmitter of the mobile platform emitting the ultrasound wave; and
    subtracting the aftershock waveform from the received sonic waveform.

3. The method of claim 2, wherein said determining the aftershock waveform comprises receiving the sonic waveform under reduced echo and/or reduced noise conditions and determining the aftershock waveform based on the received sonic waveform.

4. The method of claim 2, wherein said determining the aftershock waveform comprises determining a timing of the aftershock waveform relative to a corresponding ultrasound emission, and wherein said subtracting the aftershock waveform comprises subtracting the aftershock waveform according to the timing.

5. The method of claim 1, wherein the dynamic model is a linear dynamic model.

6. The method of claim 1, wherein the dynamic model is a non-linear dynamic model.

7. The method of claim 1, wherein the dynamic model is a fixed-speed dynamic model, a planar dynamic model, or a non-planar dynamic model.

8. An apparatus for ultrasound distance detection comprising:
  an ultrasound transmitter for emitting an ultrasound wave;
  an ultrasound receiver for receiving an ultrasound echo of the ultrasound wave, which is reflected by an object; and
  a processor configured to:
    estimate, based on a dynamic model and using a state of a mobile platform at a time when the ultrasound wave is emitted, a state of the mobile platform at a time when the ultrasound echo is expected to be received by the mobile platform, the state of the mobile platform including a position of the mobile platform and a change of the position of the mobile platform over time, and the dynamic model including a relationship between the state of the mobile platform, a change of the state of the mobile platform over time, and an assumed noise;
    predict a location of the mobile platform at the time when the ultrasound echo of the ultrasound wave is expected to be received by the mobile platform based on an average value and a variance of the state of the mobile platform at the time when the ultrasound echo of the ultrasound wave is expected to be received by the mobile platform;
    determine a set of timing constraints on a timing of the ultrasound echo being received by the mobile platform using the predicted location of the mobile platform, including determining a width and a position of the timing constraints according to the average value and the variance, respectively, of the state of the mobile platform at the time when the ultrasound echo of the ultrasound wave is expected to be received by the mobile platform;
    identify the ultrasound echo from a received sonic waveform within the timing constraints, including distinguishing the ultrasound echo from noise on the received sonic waveform by:
      dividing the sonic waveform into packets; and
      filtering the packets using a threshold packet bandwidth or amplitude to identify one of the packets that corresponds to the ultrasound echo, the threshold packet bandwidth being multiple of an average width of previously known echoes, and the threshold packet amplitude being a fraction of an average amplitude of the previously known echoes; and
    determine a distance between the mobile platform and the object according to the ultrasound echo.

9. The apparatus of claim 8, wherein the processor is further configured to, prior to identifying the ultrasound echo:
  determine an aftershock waveform resulting from residual vibrations in an ultrasound transmitter of the mobile platform emitting the ultrasound wave; and
  subtract the aftershock waveform from the received sonic waveform.

10. The apparatus of claim 9, wherein the aftershock waveform is determined by receiving the sonic waveform under reduced echo and/or reduced noise conditions.

11. The apparatus of claim 9, wherein the processor is configured to determine a timing of the aftershock waveform relative to a corresponding ultrasound emission and subtract the aftershock waveform from the received sonic waveform according to the timing.

12. A mobile platform comprising:
  an ultrasound transmitter for emitting an ultrasound wave;
  an ultrasound receiver for receiving an ultrasound echo of the ultrasound wave, which is reflected by an object; and
  a processor configured to:
    estimate, based on a dynamic model and using a state of the mobile platform at a time when the ultrasound wave is emitted, a state of the mobile platform at a time when the ultrasound echo is expected to be received by the mobile platform, the state of the mobile platform including a position of the mobile platform and a change of the position of the mobile platform over time, and the dynamic model including a relationship between the state of the mobile platform, a change of the state of the mobile platform over time, and an assumed noise;
    predict a location of the mobile platform at the time when the ultrasound echo of the ultrasound wave is expected to be received by the mobile platform based on an average value and a variance of the state of the mobile platform at the time when the ultrasound echo of the ultrasound wave is expected to be received by the mobile platform;
    determine a set of timing constraints on a timing of the ultrasound echo being received by the mobile platform using the predicted location of the mobile platform, including determining a width and a position of the timing constraints according to the average value and the variance, respectively, of the state of the mobile platform at the time when the ultrasound echo of the ultrasound wave is expected to be received by the mobile platform;
    identify the ultrasound echo from a received sonic waveform within the timing constraints, including distinguishing the ultrasound echo from noise on the received sonic waveform by:
      dividing the sonic waveform into packets; and
      filtering the packets using a threshold packet bandwidth or amplitude to identify one of the packets that corresponds to the ultrasound echo, the threshold packet bandwidth being multiple of an average width of previously known echoes, and the threshold packet amplitude being a fraction of an average amplitude of the previously known echoes; and
    determine a distance between the mobile platform and the object according to the ultrasound echo.

13. The mobile platform claim 12, wherein the processor is further configured to, prior to identifying the ultrasound echo:

determine an aftershock waveform resulting from residual vibrations in an ultrasound transmitter of the mobile platform emitting the ultrasound wave; and subtract the aftershock waveform from the received sonic waveform.

14. The mobile platform of claim 13, wherein the aftershock waveform is determined by receiving the sonic waveform under reduced echo and/or reduced noise conditions.

15. The mobile platform of claim 13, wherein the processor is configured to determine a timing of the aftershock waveform relative to a corresponding ultrasound emission and subtract the aftershock waveform from the received sonic waveform according to the timing.

16. A non-transitory computer-readable medium with instructions stored thereon that, when executed by a processor, perform a method comprising:

instructing an ultrasound transmitter to emit an ultrasound wave;

estimating, based on a dynamic model and using a state of a mobile platform at a time when the ultrasound wave is emitted, a state of the mobile platform at a time when an ultrasound echo of the ultrasound wave, which is reflected by an object, is expected to be received by the mobile platform, the state of the mobile platform including a position of the mobile platform and a change of the position of the mobile platform over time, and the dynamic model including a relationship between the state of the mobile platform, a change of the state of the mobile platform over time, and an assumed noise;

predicting a location of the mobile platform at the time when the ultrasound echo of the ultrasound wave is expected to be received by the mobile platform based on an average value and a variance of the state of the mobile platform at the time when the ultrasound echo of the ultrasound wave is expected to be received by the mobile platform;

determining a set of timing constraints on a timing of the ultrasound echo being received by the mobile platform using the predicted location of the mobile platform, including determining a width and a position of the timing constraints according to the average value and the variance, respectively, of the state of the mobile platform at the time when the ultrasound echo of the ultrasound wave is expected to be received by the mobile platform;

identifying the ultrasound echo from a received sonic waveform within the timing constraints, including distinguishing the ultrasound echo from noise on the received sonic waveform by:

dividing the sonic waveform into packets; and filtering the packets using a threshold packet bandwidth or amplitude to identify one of the packets that corresponds to the ultrasound echo, the threshold packet bandwidth being multiple of an average width of previously known echoes, and the threshold packet amplitude being a fraction of an average amplitude of the previously known echoes; and determining a distance between the mobile platform and the object based upon the ultrasound echo.

17. The method of claim 1, wherein dividing the sonic waveform into the packets includes dividing the sonic waveform into time intervals having a duration based upon a frequency of the sonic waveform, the time intervals corresponding to the packets.

18. The method of claim 1, wherein dividing the sonic waveform into the packets includes using a peak selection technique to select the packets based on peaks in the sonic waveform.

19. The method of claim 1, wherein filtering the packets further includes discarding one of the packets that has an area less than a predetermined threshold value as noise.

* * * * *